United States Patent [19]

Mergel, Jr.

[11] 4,283,972
[45] Aug. 18, 1981

[54] THREAD CHASER MECHANISM FOR A LATHE

[76] Inventor: Louis C. Mergel, Jr., 1319 Chapel Ave., San Leandro, Calif. 94579

[21] Appl. No.: 68,905

[22] Filed: Aug. 23, 1979

[51] Int. Cl.³ .......................... B23B 1/00; B23G 11/00
[52] U.S. Cl. ............................................ 82/5; 10/105
[58] Field of Search ................................ 82/5; 10/105

[56] References Cited

U.S. PATENT DOCUMENTS

| | | | |
|---|---|---|---|
| 3,174,367 | 3/1965 | Lukens | 82/5 |
| 3,191,205 | 6/1965 | Gilbert | 10/105 |
| 3,381,557 | 5/1968 | Dunn | 82/5 |
| 3,595,106 | 7/1971 | Pomella et al. | 10/105 |
| 3,673,919 | 7/1972 | Neuhauser et al. | 82/5 |
| 3,817,129 | 6/1974 | Nishimura et al. | 82/5 |
| 3,878,742 | 4/1975 | Lahm | 82/5 |
| 4,038,890 | 8/1977 | Winget | 82/5 |

Primary Examiner—Harrison L. Hinson
Attorney, Agent, or Firm—Bielen and Peterson

[57] ABSTRACT

A thread chaser for a lathe comprising a pair of detectors which signal a selected rotational position of the lead screw and the spindle of the lathe. The particular positions of both the lead screw and the spindle are transformed into a signal which is transformed into an alarm or alerting mechanism.

6 Claims, 3 Drawing Figures

THREAD CHASER MECHANISM FOR A LATHE

BACKGROUND OF THE INVENTION

The present invention relates to a novel thread chaser for a conventional lathe which permits the cutting of threads in either the metric or American system of measurement.

Threads are generally measured by the U.S. standard or the metric standard. The existent dual system of measurement necessitates that a lathe be equipped to cut both U.S. standard and metric threads. Many lathes are now equipped to perform this function since they have a dual purpose gear box. However, dual cutting lathes still have only a single lead screw for the carriage which carries the cutting tool. Thus, it is very difficult to cut a metric thread with a U.S. standard lead screw since most threads must be repeatedly cut until a finsihed product is obtained. This entails returning the cutting tool to exactly the same cutting path of the prior cut.

The usual threading procedure now employed is to cause the half-nuts to engage the lead screw of the carriage and to begin the first cut. At the end of a threading pass the lathe is reversed without disengaging the half-nuts and returned to the starting position. The lathe is then restarted and the subsequent cut of the thread takes place. This process is repeated until a proper thread is obtained in the work piece. As may be surmised, this is a slow and tedious process. In certain cases cutting a metric thread in this manner is not possible. Specifically, where the work piece has a shoulder the lathe may not be stopped in time (because of inertia), to prevent the cutting tool from damaging the shoulder. The existent thread chasers only work where the lead screw and the cuts being performed on the work piece are multiples of each other.

There is a need for a thread chaser which may be used to accurately locate a cutting path for use on multiple cuts of a work piece where the lead screw of a lathe and the piece being cut are not necessarily threaded according to the same standard of measurement.

SUMMARY OF THE INVENTION

In accordance with the present invention, a novel and useful thread chaser for lathes is provided.

The thread chaser of the present invention employs means for detecting and signalling a selected rotational position of the lead screw of the lathe and the selected rotational position of the spindle of the lathe. Each detecting and signalling means may take the form of a switch which is activated during a selected rotational position of either the lead screw or the spindle. For example, each switch may include a cam mounted to the shaft of either the lead screw or the spindle which operates in conjunction with a cam follower which travels along the surface of the cam. The follower will then indicate any selected position on the surface of the cam by the placement of an irregularity or discontinuity thereupon. The movement of the cam follower may be translated into an electrical signal or pulse.

The thread chaser of the present invention also includes means for indicating coincidental occurrence of the lead screw and the spindle. For example, when the detecting means of the lead screw or the spindle emits a pulse, as described above, a circuit may be employed to inform the lathe operator of this occurrence. This function may be accomplished by an electrical circuit which includes placing both switches in series with the gate of a silicon controlled rectifier to forward bias the same such that a relay is activated sending electrical current to an alarm device such as a light, horn, stopwatch, and the like.

In addition, the thread chaser of the present invention may also include means for indicating the time period just prior to the coincidental occurence of the selected rotational positions of both the lead screw and the spindle. Such a feature may include the placement of another alarm to the relay associated with the first alarm indicating activation of both switches to the relay operated by the rectifier. In such a case, deactivation of the rectifier would switch the relay contact from the alarm indicating coincidental activation of both switches to the alarm indicating that the system is in the ready mode or in a condition just prior to the activation of both switches. Thus, an operator may be made aware of the fact that as the lathe turns he should be ready to engage the cutting apparatus or that he should immediately engage the cutting apparatus. It is contemplated that the present invention also includes means for automatically engaging the cutting apparatus upon receipt of a signal from the activation of both switches. In such a case, any human reaction time would be eliminated from the system.

It may be apparent that a novel and useful thread chaser for a lathe has been described.

It is therefore an object of the present invention to provide a thread chaser for a lathe which permits the cutting and recutting of metric threads with a lathe having a U.S. standard lead screw.

It is another object of the present invention to provide a thread chaser for a lathe which eliminates the need for maintaining engagement of the carriage half-nuts, stopping the forward movement of the carriage, reversing the carriage, and starting the carriage again in a forward direction to obtain multiple passes in the cutting of a thread.

It is yet another object of the present invention to provide a thread chaser for a lathe which eliminates the need for constructing a lathe with dual lead screws, one having a U.S. standard thread and one having a metric thread.

It is still another object of the present invention to provide a thread chaser for a lathe which permits the operator of the lathe to manually engage the cutting tool at the precise moment necessary to effect a thread cutting path which is identical to a previous thead cutting path on a work piece.

It is another object of the present invention to provide a thread chaser for a lathe which is compatible with automatically initiated cutting operations for production of a thread via multiple cuts.

The invention possesses other objects and advantages especially as concerns particular characteristics and features thereof, which will become apparent as the specification continues.

For a better understanding of the invention, reference in made to the following detailed description.

DESCRIPTION OF THE PREFERRED EMBODIMENTS

Various aspects of the present invention will evolve from the following detailed description of the preferred embodiments thereof, which should be taken in conjunction with the heretofore described drawings.

Figure 1:
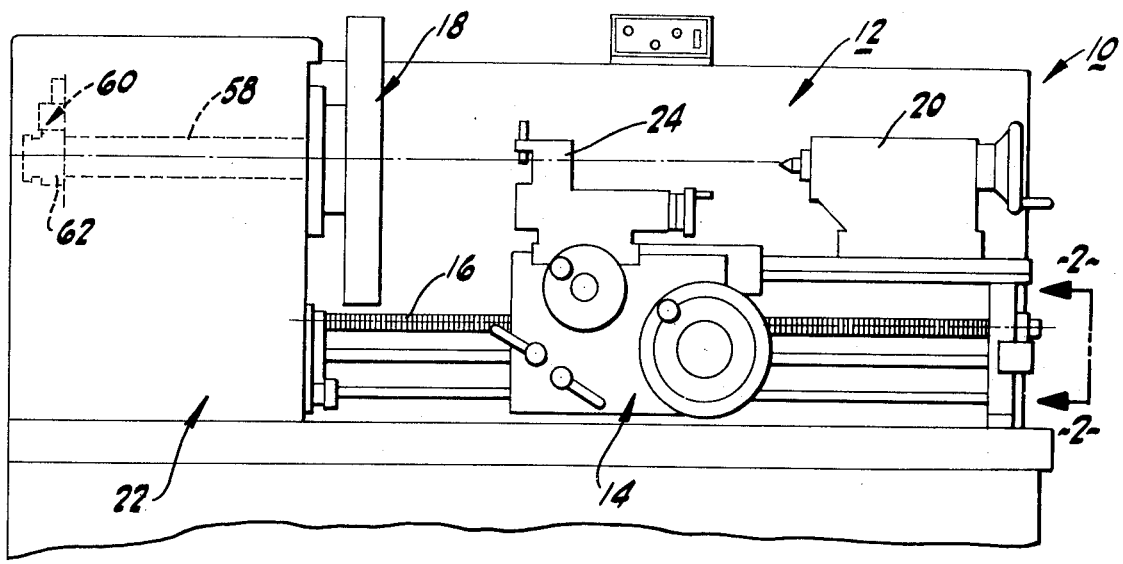
FIG. 1 is a slightly broken side view of a typical lathe.

With reference to the drawings, the invention as a whole is depicted by reference character 10. With reference to FIG. 1, a lathe 12 of typical construction is shown. Lathe 12 includes a carriage 14 which rides on lead screw 16. The work piece is placed on spindle 18 and tailstock 20. A gear box 22 provides the proper lead screw speed for the particular threads being cut on a work piece. Lead screw 16 is engaged by half-nuts (not shown), associated with the carriage 14 such that carriage 14 and tool post 24 move along the work piece being cut in the conventional manner. Thus, to cut a thread on a work piece the operator selects the proper speed to turn spindle 18 and engages lead screw 16 to move carriage 14, normally from right to left as shown on FIG. 1. Thus, the cutting tool on tool post 24 moves from right left. As heretofore described, most threads require multiple passes which necessitates synchronizing or following exactly the same cutting path as the prior cut on the work piece.

Figure 2:
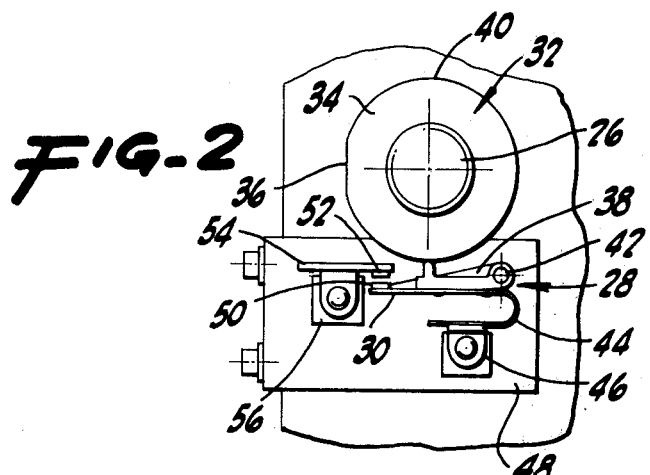
FIG. 2 is a view taken along line 2—2 of FIG. 1.

Turning to FIG. 2, it may be seen that lead screw 16 includes a shaft 26 which extends beyond the confines of lathe 12 proper. The device of the present invention includes means 28 for detecting and signalling a selected rotational position of shaft 26 and therefore lead screw 16 of lathe 12. Means 28 may include a first switch 30 and means 32 for activating switch 30 during a selected rotational position of shaft 26 and therefor lead screw 16. Means 32 for activating switch 30 may include a cam 34 which is mounted to shaft 26 for rotation therewith. The specific embodiment of cam 34 shown in FIG. 2 includes a flattened portion 36 which may have a length of approximately six millimeters. Cam 34 may be fixed to shaft 26 in any known manner such as fastening the same with screws or bolts, gluing, or integrally forming cam 34 with the shaft 26.

Switch 30 includes a cam follower 38 which rides on surface 40 of cam 34. Cam follower 38 pivots around pin 42 and is fixed to spring 44 by bracket 46. Bolt 48 holds bracket 46 to mounting plate 48 and to the body of lathe 12. Spring 44 is metallic and therefor is a conductor of electrical current. Contact points 50 and 52 touch one another when cam follower 38 travels over flattened portion 36 of cam 34. Contact point 52 is connected to electrically conductive arm 54 which is fixed to mounting plate 56 on the body of lathe 12. It should be noted that mounting plates 48 and 56 are constructed of electrically insulative material such that an electrical current may flow from bracket 46, through spring 44, between contact points 50 and 52, and arm 54. It has been found that where shaft 26 and cam 34 rotate at approximately 250 rpms, contact points 50 and 52 will maintain contact for about 10 milliseconds.

Returning to FIG. 1 it may be seen that spindle 18 includes a shaft 58 which includes means 60 for detecting and signalling a selected rotational position of the spindle 18 of lathe 12. Shaft 58, the embodiment shown on the drawings, would include an arrangement identical to that shown in FIG. 2. In other words, means 28 for detecting and signalling a selected rotational position of lead screw 16 is identical to means 60 for detecting and signalling a selected rotational position of spindle 18. Means 60 is shown in phantom on FIG. 1.

Figure 3:
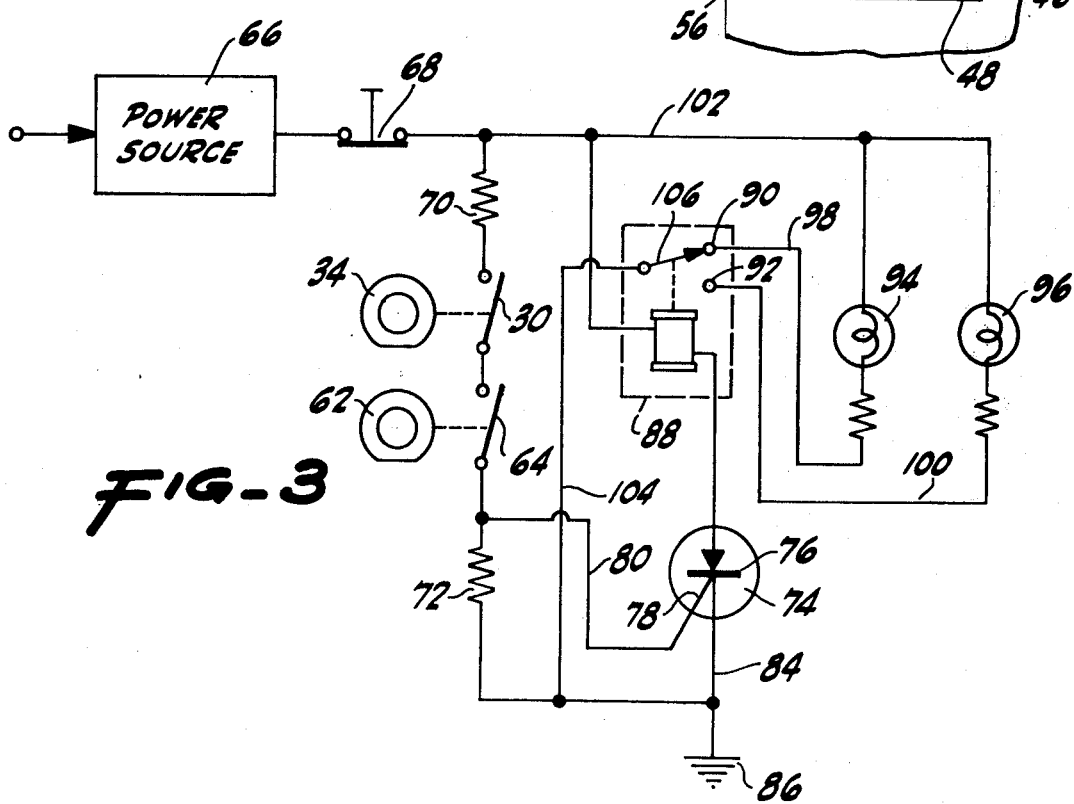
FIG. 3 is schematic view of a circuit associated with the invention.

Turning to FIG. 3, it may be seen that cam 34 and cam 62, attach to spindle 18 and lead screw 16 respectfully for rotation therewith, are depicted schematically. Switch 30 and a switch 64 associated with cam 62, identical in configuration to switch 30, are connected in series. Arm 54 and bracket 46 are also depicted schematically as legs on either side of switch 30. An electrical source 66, such as 12 volts of D.C. electrical power is provided by any known means. For example, power supply 66 may be a dry cell battery, a wet cell battery, and the like. Switch 68 connects to power supply 66 and is normally in a closed position as shown. Resistors 70 and 72 flank either side of switches 30 and 64 which as heretofore explained, are connected in series. Rectifier 74 includes a gate 76 which is connected to node 78 via leg 80. Leg 82 from resistor 72 and leg 84 from the cathode of rectifier 74 lead to ground 86. The anode of rectifier 74 passes to a single pole double throw relay 88. Relay 88 switches between contact points 90 and 92 which connect to alarm means 94 and 96 via legs 98 and 100. Leg 102 connects alarm means 94 or 96 to switch means 68. Leg 104 essentially connects pole 106 of relay 88 to ground 86.

The following is a table of selected values of components of the circuitry shown in FIG. 3. It should be noted that values contained hereinbelow are inserted for the purposes of making a complete disclosure of the embodiment and are not intended to be restrictive of the invention contained herein:

COMPONENT TABLE

| | |
|---|---|
| Switch 68 | 125 VAC, 6 amp |
| Switch 30 | Automobile dist. point |
| Switch 64 | Automobile dist. point |
| Resistor 70 | 12 K ohm, ½ watt |
| Resistor 72 | 620 ohm, ½ watt |
| Resistors, Alarm means 94 and 96 | 47 ohm, ½ watt |
| Rectifier 74 | SCR, Sylvania ECG5404 |
| Lamps, Alarm means 94 and 96 | 6 volt, 150 milliamp |
| Relay 88 SPDT | 12 VDC, 1 amp, 950 ohms |
| Power Supply 66 | Radio Shack, 12V DC |

In operation, lathe 12 is activated in the proper gear and a tool is selected for cutting the desired thread on a work piece. The operator may easily view device 10 mounted on top of lathe 12, FIG. 1. Power supply 66 normally will activate alarm means 94, a light, since pole 106 of relay 88 engages contact 90. Alarm means 94 would indicate that the operator is "ready" to cut the thread on the work piece. At this point, cams 34 and 62 begin to turn and turn on and off switches 30 and 64. At some point during the turning of spindle 58 and lead screw 16, switches 30 and 64 will be on at the same time. At this point electrical current will flow through resistor 70, switches 30 and 64, to node 78, and from there to gate 76 of rectifier 74 via leg 80. Electrical current also flows through resistor 72 to rectifier 74. This action forward biases the gate of rectifier 74 to be on or conducting mode. Such forward biasing will activate relay 88 and switch pole 106 from contact 90 to 92. Current will then flow to alarm means 96 in preference to alarm means 94. At this point, the operator of the lathe should "engage" carriage 14 to lead screw 16 and begin the cutting operation of the work piece. After the first pass on the work piece the Examiner may disengage carriage 14 from lead screw 16 and return carriage 14 to begin the second pass. Switch 68 is opened which will again activate alarm means 94 for the "ready" mode. Since carriage 14 must be returned to exactly the same position at the start of each cutting pass, the operator should wait for alarm means 96 to activate again before he begins the second pass. When switches 30 and 64 close at the same time, indicating coincidental occurrence of the particular rotational positions of spindle 58 and lead screw 16 where the first pass began, the operator again engages carriage 14 to lead screw 16. Thus, the second pass follows exactly the same path as the first pass on the work piece to produce the proper thread. It is contemplated that alarm means 96 may be used in conjunction with a timing device or an automatic mechanism to initiate cutting of the work piece. In this manner any human reaction time is eliminated.

It should be apparent that metric threads may be cut from a U.S. standard lead screw employing the thread chaser of the present application. The thread chaser of the present application may also be applied to lathes having a dual purpose gear box equipped with a metric lead screw. With this arrangement the thread chasing device of the present application would be used to cut U.S. standard threads.

While in the foregoing specification embodiments of the invention have been set forth in considerable detail for the purposes of making a complete disclosure of the invention, it will be apparent to those of ordinary skill in the art that numerous changes may be made in such details without departing from the spirit and principles of the invention.

What is claimed is:

1. A thread chaser for a lathe comprising:
    a. means for detecting and signalling a selected rotational position of the lead screw of the lathe comprising:
        a first switch, means for activating said first switch during a selected rotational position of the lead screw, and means for signalling the activation of said first switch;
    b. means for detecting and signalling a selected rotational position of the spindle of the lathe comprising:
        a second switch, means for activating said second switch during a selected rotational position of the spindle, and means for signalling the activation of said second switch;
    c. means for indicating coincidental occurrence of a selected rotational position of the lead screw and a selected rotational position of the spindle, said indicating means receiving said position signals of said detecting and signalling means for said lead screw and spindle.

2. The thread chaser of claim 1 in which said means for activating said first switch includes a first cam mounted to the lead screw shaft for rotation therewith, and said first switch includes a first cam follower adapted for traveling on a surface of said first cam; and said means for activating said second switch includes a second cam mounted to the spindle shaft for rotation therewith, and said second switch includes a second cam follower adapted for traveling on a surface of said second cam.

3. The thread chaser of claim 2 in which said means for indicating coincidental occurrence of the selected rotational positions of the lead screw and spindle of the lathe includes a source of electrical power connected in series with said first and second switches, a rectifier, a relay and alarm means for indicating coincidental occurrence, a selected rotational position of the lead screw, and a selected rotational position of the spindle.

4. The thread chaser of claim 3 which additionally includes means for resetting said alarm means.

5. The thread chaser of claim 4 in which said rectifier is electrically connected to ground and forward biased by simultaneous activation of said first and second switches.

6. The thread chaser of claim 5 which additionally comprises alarm means for indicating the time period prior to said coincidental occurrence of a selected rotational position of the lead screw and a selected rotational position of the spindle.

* * * * *